United States Patent Office 3,236,722
Patented Feb. 22, 1966

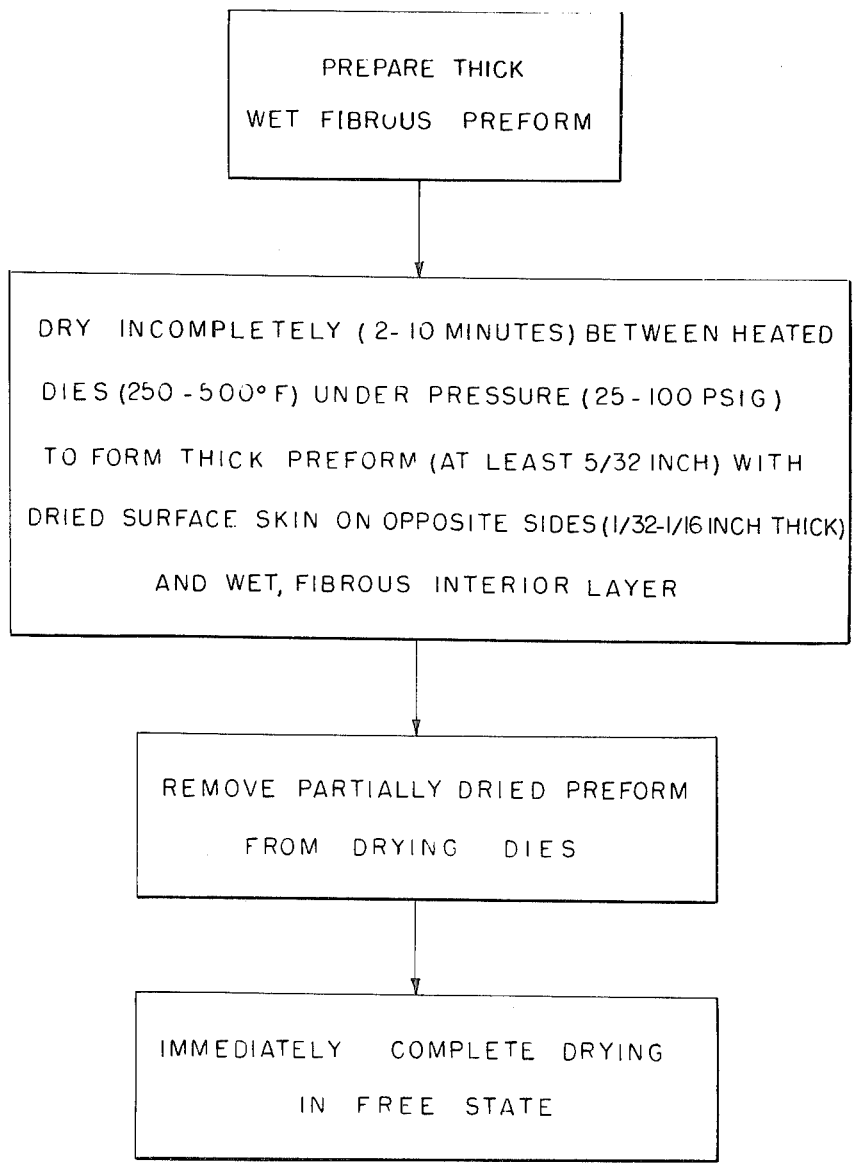

3,236,722
PROCESS FOR MAKING THICK MOLDED
FIBER PARTS
Richard J. Box, St. Charles, Ill., assignor to Hawley
Products Company, St. Charles, Ill., a corporation of
Delaware
Continuation of application Ser. No. 41,773, July 11,
1960. This application June 13, 1963, Ser. No. 287,494
7 Claims. (Cl. 162—222)

This application is a continuation of my application Serial No. 41,773 filed July 11, 1960, and now abandoned.

This invention relates to a process for producing molded fiber articles and more particularly to a process for producing thick molded fiber articles. The term "thick" as used herein refers to finished articles having a thickness of at least 5/32 inch.

It is known in the art to manufacture fibrous articles from an aqueous slurry of fibers by accreting the slurry onto a foraminous former as shown, for example, in Hawley U.S. Patents 1,984,019 and 2,006,831. It is also known to die dry preforms which have been made by this aqueous slurry method as shown, for example, by Manson, U.S. Patents 1,951,940, 1,983,553, 1,983,554 and 2,082,409. The manufacture of molded fibrous articles by such methods can be carried out very successfully so long as the wall thickness of the article is relatively thin.

In the molded fiber industry, it is generally known how to produce molded fiber articles up to about 5/32 inch in thickness, by preforming from a slurry on a perforate mold, transferring to mating drying dies which apply heat and pressure, to produce dry, dense parts. In usual practice, the moisture content of the pressed and die dried parts is below fifteen percent by weight and the density is in the range of about 0.5 to 1.0 gram per cubic centimeter. At the highest temperatures, approximately 400° to 500° F., that can be used without seriously decomposing cellulosic fibers, about five minutes time is required to press dry a 5/32 inch part. The time required varies approximately as the square of the thickness. Approximately twenty minutes time is required to dry a part 5/16 inch thick and more than an hour is required to dry a part 5/8 inch thick. Because of the long press time and the expense of drying dies and presses, it has not been practical for many applications to make parts thicker than 5/32 inch by known die drying processes.

The dies used in a die drying process consitute one of the more expensive features of the process. Hence, the longer a given piece is allowed to remain between a pair of dies, the more expensive the process becomes.

One of the objects of the present invention, therefore, is to provide a new and improved method which is economical for producing smooth, dense, molded fiber parts having a thickness of at least 5/32 inch and preferably from 5/32 inch to 1 inch.

Another object of the invention is to provide a process of the type described in which thick pieces can be molded using a die drying method but with a relatively short residence time in the die drying dies.

A further object of the invention is to provide a new and improved method for making thick pieces of molded fiber in which substantial warpage and distortion of the molded fiber pieces are avoided. Other objects will appear hereinafter.

In accordance with the invention, a wet, felted fibrous part or preform, which can be made by felting fibers, preferably cellulose, on to a foraminous former from an aqueous slurry, is subjected to partial drying between a pair of heated mating drying dies or molds for a relatively short period of time and under superatmospheric pressure exerted by said dies or molds under conditions such that the surfaces of said part or preform are dried to form a dried skin or surface which is sufficiently strong to maintain the integrity of said part or preform when it is removed from said dies while still retaining excess moisture in the interior of said part or preform, and thereafter said excess moisture is removed from said part or preform by heating it in an uncompressed state, preferably under atmospheric pressure conditions, for example, by drying in a heated oven.

In carrying out this process it is preferable to provide vacuum drainage for one or both of the heated dies or molds. Excellent results have been obtained by compressing relatively heavy, wet, fibrous preforms between a pair of heated mating drying molds or dies having a vacuum drainage arrangement for a period of time in the range of two to ten minutes, removing the partially dried, but moisture laden, part or preform to a heated oven where the drying is carried to completion. To fully avoid warpage or distortion it is desirable to place the part in the heated oven within a short time after it is removed from the hot compressing molds or dies.

A flow diagram of the process is represented in the accompanying drawing.

The invention will be further illustrated but is not limited by the following examples in which the quantities are stated in parts by weight unless otherwise indicated.

*Example I*

A layer of pulp comprising 70 parts by weight of sulfate fiber, 20 parts ground wood and 10 parts shredded wood was filtered out of a 1% slurry onto a foraminous mold which was shaped to produce an armless chair seat and back in one piece. The resulting felt was about 1½ inches thick, contained about 4 grams of fiber per square inch, and about 10 grams of water per square inch. The felt was made on conventional molded fiber slurry tank and moving platen type felting equipment. It was transferred to gas heated drying molds, the mold contacting the backside of the chair being drained through a perforated metal screen and underlying grooves to a wet vacuum pump, and the mold contacting the front side being smooth. The molds were made of cast iron and were heated from above and below by gas fires. The mold was closed and a superatmospheric pressure of about 50 pounds per square inch, based on the projected area of the chair part, was applied.

When the mold was first closed, a slight positive pressure, caused by initial rapid formation of steam by contact of the hot molds with the wet fibrous surfaces, was present in the vacuum drainage grooves under the perforated metal spinning. After about 15 to 30 seconds, the pressure in the grooves had decreased to atmospheric and a vacuum began to appear. After 2 minutes it leveled off at about 6 inches of mercury. After 4 minutes, the mold was opened and the part was removed. The surfaces were dry to a depth sufficient to make the part self-supporting. It was set aside at room temperature for 2 days. After about 15 minutes, water from inside had diffused through to the point that the part appeared damp. It still retained a smooth surface and its proper shape. After 2 days it was placed in a heated oven at 225° F. and thoroughly dried. About 6 hours were required for drying. Measurement showed that the part had bent so that the top of the back was 1¼ inches forward of its proper position relative to the seat. The density of the part was 0.55 gram per cubic centimeter. The part was, to all appearances, as smooth on both surfaces as though it had been fully dried in the hot molds. Actually when removed from the die drying mold, it contained 1,950 grams of fiber and 1,500 grams of excess water as determined by weighing after removing from the mold and after drying in the oven.

In the above embodiment of my invention, it is important to maintain adequate vacuum in the grooves under the perforated metal spinning of the mold because this reduces pressure in the part sufficiently to prevent blowing up or delamination of the part when the mold is opened. For example, in one test the vacuum was reduced to three inches of mercury. This caused the part to delaminate badly when the mold was opened. It was found necessary to increase the press time to eight minutes to prevent delamination when a vacuum of only 3 inches of mercury was used. On the other hand, if a vacuum of 10 inches of mercury is maintained in the grooves, the press time can be reduced to about 3 minutes. The time and vacuum relationships are also affected by the mold temperatures and by the freeness of the pulp. Increasing the mold temperature requires higher vacuum because steam is generated faster in the part. Tighter pulp requires higher vacuum because it is more difficult for the steam to get out of the pulp. Increasing the pressing pressure also requires higher vacuum because it densifies the fiber making it more difficult for steam to escape. Conversely, freer pulps, lower temperatures and less pressure, permit the use of less vacuum.

In some instances, depending upon the design of the parts being made, it is possible to supply vacuum drainage to both parts of the molds. This facilitates reduction of vapor pressure in the part and further speeds the hot pressing operation.

*Example II*

The procedure was the same as in Example I except that the chair part was removed from the mold in 4 minutes and placed immediately in an oven heated to 225° F. After drying, this part was found to have retained its shape within ⅛ inch as compared to the 1¼ bend in the part allowed to stand 2 days before oven drying.

This example illustrates that it is desirable to subject the partially die dried part to further drying before the dried skin or surfaces of the part have become damp due the tendency of the internal moisture to come to the surface. By completing the drying of the part after removal from the hot pressing mold and before the surface skin has become damp again, distortion is substantially avoided. The dry surfaces hold the part to shape while the moisture evaporates inside and continue to hold the part in shape during the drying process, for example, when the part is placed in a heated oven.

In partially die drying the part it is advantageous to reduce the pressure for a few seconds prior to opening the mold. This reduces the rate of heat transfer from the mold to the part. This in turn reduces the rate of evaporation in the interior of the part which in turn reduces the water vapor pressure in the part, thereby reducing the tendency towards delamination or blistering when the mold is opened, i.e., when the die drying dies are separated. The net gain from this mode of operation is a reduction of the minimum press time required under given conditions. This is illustrated by the following example.

*Example III*

A fibrous preform comprising 50 parts kraft pulp, 30 parts rag pulp and 20 parts shredded wood was mechanically pressed between die drying dies one of which was perforated for 1½ minutes at 75 pounds per square inch, 400° F., and a 20 inch vacuum, the vacuum being applied to the perforated die. Then the mechanical pressure was reduced to zero except for the weight of the dies, for 1 minute, after which the mold was opened. During this short period of reduced mechanical pressure the application of subatmospheric pressure to the perforated die drying was continued. The resultant part was placed immediately in an oven at 250° F. for 2 hours. The part was 0.27 inch thick, had a density of 0.6 gram per square inch, was smooth and free of any warpage, distortion, blistering or delamination.

Parts made according to the procedure described in Examples I, II and III may, if desired, be impregnated with resinous solutions and cured to obtain improved strength and moisture resistant properties. Many different types of resins and methods of impregnation are known to those skilled in the art of molded fiber manufacture. The relatively thick parts require more time for thorough impregnation and curing than presently manufactured thin parts. Otherwise, dipping and curing operations are similar to those already known.

It may be advantageous in some instances, where resin treatment is desired, to dip the parts immediately after hot pressing and prior to placing them in the drying oven. An oleoresinous varnish, such as are well known to those skilled in the art of molded fiber processing, impregnates the two dried skins of the hot pressed parts. During oven treatment, drying of the interior of the part and curing of the varnish in the outer layers occurs simultaneously. The resulting finished part thus comprises an untreated molded fiber core between two resin treated skins. This structure has excellent flexural strength, hard and water resistant outer skins.

The advantage of the resin treatment may be illustrated by the following example for two test pieces, wherein piece A was placed in the oven immediately after removal from the press and piece B, although very similar to piece A in other respects, was dipped in a 12% solution of oleoresinous varnish after pressing and before placing in the oven.

*Example IV*

|  | Piece A | Piece B |
| --- | --- | --- |
| Percent Solids: |  |  |
| Before Hot Pressing | 24 | 22 |
| After Pressing | 71 | 72 |
| Mold, Pressure, p.s.i.: |  |  |
| 4½ Minutes | 75 | 75 |
| 1 Minute | 0 | 0 |
| Mold Temperature, ° F | 400 | 400 |
| Oven Drying and Curing, hours at 275° F | 2 | 2 |
| Thickness, in | .280 | .258 |
| Density, g./cc | .69 | .74 |
| ASTM Flexural Strength, p.s.i | 6,100 | 8,200 |
| Warpage | None | None |
| Percent Resin Solids | None | 8 |

The varnish treated piece B was observed to have a harder surface than Piece A and to absorb water more slowly than Piece A.

It will be understood that the invention is not limited to the particular examples given for the purpose of illustration. Many variations and modifications may be made without departing from the scope of the invention.

The pressures used for compressing the thick felted fibrous part between heated dies or molds are subject to variation but are preferably within the range of 25 to 100 pounds per square inch gauge.

The temperatures used are also subject to variation. In general, they should be sufficiently high to vaporize moisture under the pressure conditions used but insufficiently high to scorch the part being dried. Temperatures from 250° F. to 500° F. are preferred.

As previously indicated, the time required for the partial die drying is subject to variation but should be sufficient to form a dry skin on the surfaces of the partially dried pieces and good results have been obtained by using a time period from about 2 to 10 minutes.

The thickness of the initial felted fibrous preform before being partially die dried is subject to variation but is usually within the range of 1½ inches to 4 inches. When it comes out of the forming slurry or bath the preform is saturated with water and is heavy and wet. An optional procedure which is very often desirable in the practice of the invention is to give the thick felted fibrous preform a pre-squeeze either while it is still beneath the surface of the aqueous slurry or after it has been withdrawn from the aqueous slurry. This removes some of the water which would otherwise run off when the preform is removed from the slurry, but for all practical purposes the preform is still saturated with water and is wet in appearance.

The depth of the dried surface or surface skin produced by the partial die drying is subject to variation but is usually around 1/32 inch to 1/16 inch.

As already indicated, the thickness of finished articles prepared in accordance with the present invention, while also subject to variation, is preferably within the range of 5/32 inch to 1 inch. The density of the finished parts where not subjected to a resin or varnish treatment is preferably within the range of 0.45 to 0.75 gram per cubic centimeter. Where a resin or varnish treatment has been applied, the density may be substantially higher depending upon the kind and amount of such treatment.

The application of a water insoluble coating substance between the die drying and final drying is not limited to the use of a particular substance. Any water insoluble substance which adheres to the fibers can be used. Such substances are usually applied in the form of solutions, dispersions or emulsions in a suitable solvent or liquid carrier medium. Urea formaldehyde resins, phenol formaldehyde resins and other resins in a water soluble or fusible state can be applied to the partially dried parts and then converted to an infusible or thermoset state by the subsequent heating step. Similarly, thermoplastic resins such as, for example, polyvinyl acetate, polystyrene, and methyl methacrylate can be applied.

The invention makes it possible to manufacture thick felted fibrous parts simply and economically and with a minimum amount of warpage or distortion. It was not heretofore realized that the thick felted fibrous parts could be partially die dried sufficiently to provide a dry surface skin which would hold the parts together enough so that the drying could be completed out of contact with the die drying dies in an oven at pressures below superatmospheric pressures. Moreover, it was not realized heretofore that the internal moisture which still remains after the partial die drying could be removed by ordinary oven drying while still retaining the shape and desirable surface characteristics of the die dried part. Rather, it was to be expected that the escape of the internal moisture with the parts in an uncompressed state (i.e., out of contact with the die drying dies) would result in surface rupture and damage to the finished parts.

The expression "heating in a free state" is intended to cover heating the part under conditions such that no overall or general mechanical pressure, which would ordinarily hold the part in shape, is being applied to the surface of the part by means of dies or otherwise.

It will be understood that while the invention is especially useful in the manufacture of articles from cellulose, it can be employed with many different types of fibers, including many different types of cellulose. Examples of such fibers are those derived from flax, ramie, jute, hemp, cotton, caroa, sisal, asbestos, glass fibers and combinations of cellulosic fibers with other fibers, especially combinations of cut bundles of glass filaments (e.g., cut rovings), and cellulose containing 2% to 98% glass fibers and the remainder cellulose fibers. The invention can also be used in making articles from combinations of cellulose with synthetic polymeric fibers, such as nylon (linear polyamides), linear polyesters (e.g., Dacron), linear polyolefins (e.g., polyethylene and polypropylene fibers), and other thermoplastic fibers or filaments. It will be recognized that the conditions employed must be controlled, particularly the temperature conditions, where it is desired to maintain the identity of thermoplastic synthetic fibers in the finished product.

The invention is hereby claimed as follows:

1. A process for manufacture of thick, molded fibrous articles which comprises subjecting a wet, fibrous preform to mechanical compression of 25–100 p.s.i.g. between a pair of drying dies, each of which is heated to a temperature in the range of 250° F. to 500° F., evaporating moisture from said wet preform sufficient to form an incompletely dried preform with dried surface skins on opposite sides of said preform, the compressed preform having a thickness of at least 5/32 inch, each skin having a depth of about 1/32 inch to about 1/16 inch, the inner portion of said incompletely dried preform between said skins being a wet, fibrous layer, the period of time in which said preform is in said drying dies being in the order of about 2–10 minutes, removing the so-formed, partially dried preform from said drying dies, and immediately after removal of the preform from said dies completing the drying of said preform with the latter in a free state.

2. A process as claimed in claim 1 wherein the water vapor pressure in said preform is reduced by a substantial amount for at least a few seconds while said preform is held between said heated drying dies just prior to removal thereof from said dies, thereby reducing the tendency toward delamination of said preform when said drying dies are separated for removal of said preform therefrom.

3. A process as claimed in claim 2 wherein said water vapor pressure is reduced by reducing the mechanical compression of said heated dies on said preform for at least a few seconds just prior to the removal of said preform therefrom in order to reduce heat transfer between the heated dies and said preform.

4. A process as claimed in claim 3 wherein said mechanical compression is reduced to zero except for the weight of said dies just prior to said removal of said preform.

5. A process as claimed in claim 1 wherein a water insoluble coating is applied to said surface skins of said preform prior to said completing of the drying of said preforms with the latter in a free state.

6. A process as claimed in claim 5 wherein said coating is an oleoresinous varnish.

7. A process as claimed in claim 1 wherein at least one of the preform-contacting surfaces of said drying dies is foraminous, and vapor formed during said drying of said preform under said mechanical compression is evacuated through the foraminous surface under vacuum.

References Cited by the Examiner

UNITED STATES PATENTS

| | | | |
|---|---|---|---|
| 2,681,599 | 6/1954 | Palese | 162—221 |
| 2,744,013 | 5/1956 | Dorland | 162—221 |

DONALL H. SYLVESTER, *Primary Examiner.*